ent, thereby rendering it more attractive for numerous types of field explorations, such as determining dam site locations, sources of water supply, fill material, bridge foundations, identification and classification of subsurface materials, bed rock depth and the like.
United States Patent Office 2,980,884
Patented Apr. 18, 1961

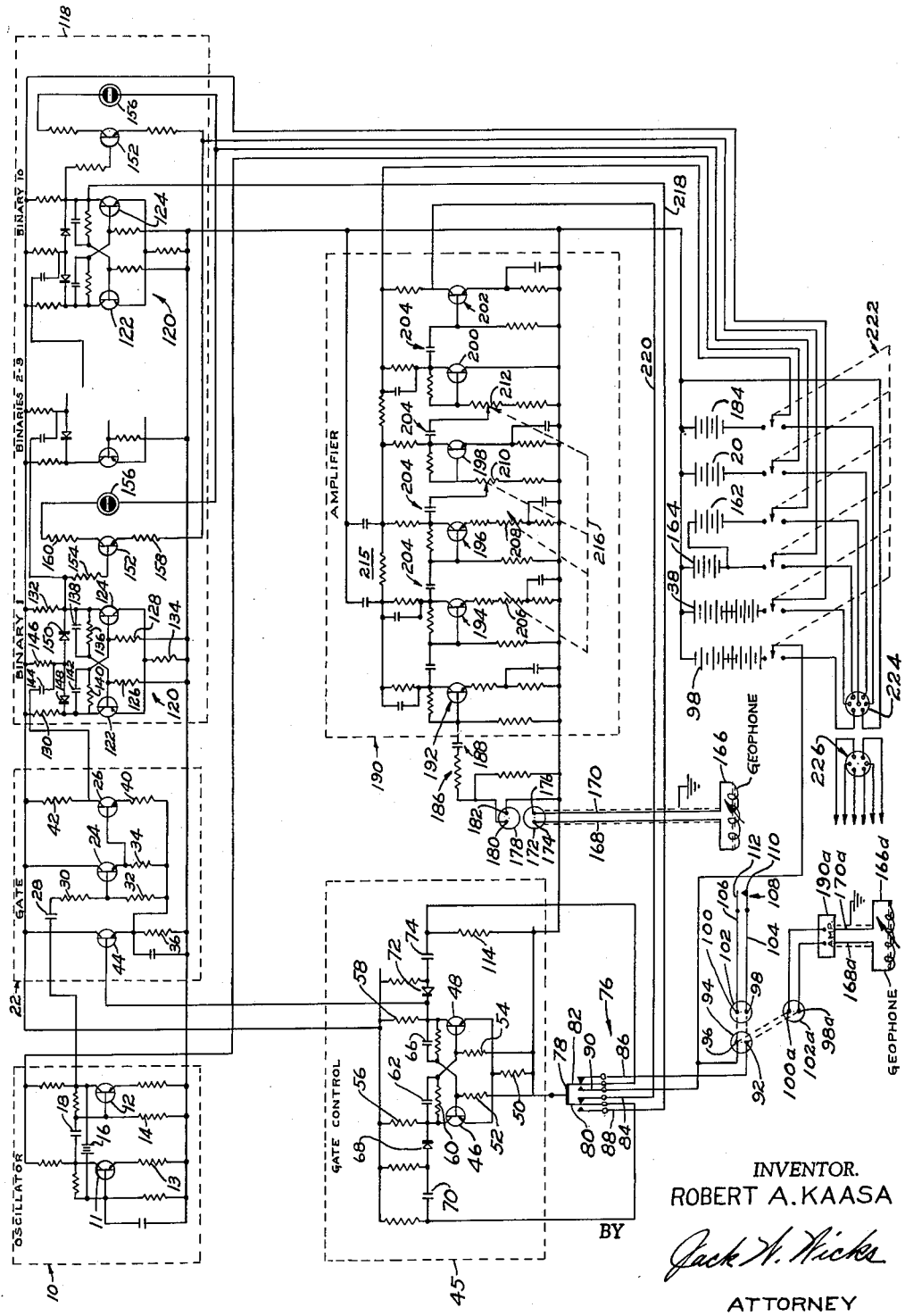

2,980,884

APPARATUS FOR MEASURING THE TIME BETWEEN SEISMIC EVENTS WITH A COUNTER

Robert A. Kaasa, Hopkins, Minn., assignor to Geophysical Specialties Company, Hopkins, Minn., a corporation of Minnesota Filed Nov. 1, 1957, Ser. No. 694,033

16 Claims. (Cl. 340—15)

This invention relates generally to seismic apparatus and pertains more particularly to apparatus of this character that will find especial utility in conducting various relatively shallow subsurface explorations where exceptionally portable equipment would be desirable.

No need exists at this time to describe in detail the basic concepts underlying the making of seismic surveys, for these concepts are well known by those persons familiar with the seismograph art. Briefly, though, what occurs is that when vibrations are produced at or near the earth's surface, seismic or sound waves travel through the ground to another location where they are picked up by a suitable detector. The path of sound waves, like the path of light waves, traverses a course requiring the least travel time. The velocity of these sound waves is directly influenced by the nature of the material encountered, particularly upon its degree of consolidation. Accordingly, owing to refraction that takes place by the waves passing from a low velocity segment into a high velocity segment, it follows that a longer path having a high velocity segment therein may require less time for the waves to reach the detector than via a direct route. However, the apparatus can also be used to time reflective seismic waves.

In prior art seismograph systems it has been generally customary to record the time taken by the sound waves traveling from their point of origin to a selected pick up location by exposing a moving photo-sensitized strip of paper to an oscillographically produced trace of light. Not only must the drive motor for the paper strip be operated at a constant speed in order to introduce a time base or function into the record, but the strip must be photographically developed before its intelligence is made visibly available. These requisites obviously pose certain problems in conducting field surveys at remote vantage points.

Accordingly, one important object of the invention is to provide seismic apparatus that will determine in a direct manner the time of travel of the fastest seismic wave. More specifically, it is an aim of the invention to generate a constant frequency signal and to count electronically the number of elapsed cycles between the moment that the seismic vibrations are set up to the moment that the first arrival wave resulting therefrom is received at a different locus from that where the vibrations are produced. Thus, it will be apparent that my apparatus obviates the need for a speed controlled drive motor, an oscillograph, and a recording medium requiring the use of photographic developing techniques.

Another object of the invention is to measure in a precise manner the travel time alluded to above.

A further object of the invention is to provide seismic apparatus that will require very little electric power for its operation, thereby permitting the use of only a few batteries with a concomitant reduction in weight. Also, it is contemplated that transistorized printed circuitry be utilized in further achievement of a very lightweight seismic instrument. It will also be appreciated that the particular circuitry involved, together with its low power requirements, enhances the portability of the instrument, thereby rendering it more attractive for numerous types of field explorations, such as determining dam site locations, sources of water supply, fill material, bridge foundations, identification and classification of subsurface materials, bed rock depth and the like.

Still another object is to provide an instrument of the above character that is exceptionally simple to operate, requiring no highly skilled technicians with respect to the operation of the instrument itself, although the general planning of the explorations and the analysis of the data obtained should be conducted by one familiar with seismic principles. Actually, one man can obtain the desired data, if necessary or expedient to do so.

A further object is to provide complete seismic equipment that will be relatively inexpensive to manufacture and which is not likely to get out of order easily. In this way many contractors will be induced to purchase the apparatus for use on numerous small construction projects where the cost of hitherto available equipment would be prohibitive.

Yet another object of the invention is to provide seismic apparatus that does not demand the use of dynamite in producing the seismic waves, although it lends itself readily to such use should special circumstances so dictate.

Other objects will be in part obvious and in part pointed out more in detail hereinafter.

The invention accordingly consists in the features of construction, combination of elements and arrangement of parts which will be exemplified in the construction hereafter set forth and the scope of the application which will be indicated in the appended claims.

In the drawing, the single figure there presented is a schematic representation of the invention.

Referring now to the schematic electrical diagram exemplifying the invention, it will be seen that my seismic apparatus comprises a crystal controlled oscillator denoted generally by the numeral 10. The oscillator 10 includes a pair of P-N-P transistors 11 and 12 having their emitters grounded through a pair of resistors 13, 14 and having a piezoelectric crystal 16 between the collector of transistor 12 and the base of transistor 11 to furnish a controlled feed-back path. The two depicted stages of the oscillator 10 are coupled together via a capacitor 18. It will be seen that a battery 20 applies bias in a forward conducting direction to the collector circuits of the transistors 11 and 12. It may be explained at this time that the oscillator 10 is designed to function as a free-running multivibrator having a substantially square wave output of 4,000 c.p.s., in the illustrative instance.

The output from the oscillator 10 is fed to a gate circuit indicated generally by the numeral 22. The gate 22 is essentially a two-stage amplifier comprised of a pair of direct-coupled transistors 24 and 26, the emitter of transistor 24 being joined to the base of the transistor 26. Coupling from the collector of transistor 12 is effected through a capacitor 28 and resistor 30 connected to the base of the transistor 24. The transistors 24 and 26 are normally biased to a low conducting state through resistors 32, 34 and a common resistor 36 connected to the positive side of a battery 38. The emitter of transistor 24 is likewise connected to the positive side of the battery via the resistors 34 and 36, whereas the emitter of the transistor 26 is connected to the positive side through a resistor 40 and said resistor 36. On the other hand, the collector of transistor 24 is directly connected to the negative side of the battery 38, whereas the collector of transistor 26 is connected to the negative side through a resistor 42.

As stated above, the transistors 24 and 26 are normally biased to a low conducting state and hence there is no effective current output from the collector and emitter of transistor 26, even though the 4,000 cycle signal is being applied to the base of the transistor 24 from the oscillator 10. It is the function of a transistor 44 to alter the bias of the transistor 24 to cause conversion thereof from a low conducting state to a high conducting state (and hence high conduction of the transistor 26). In other words, the gate 22 is normally "closed" to the passage of the 4,000 cycle signal therethrough and will be "opened" only when the transistor 44 is made highly conductive by the application of a proper bias on its base.

To open the gate circuit 22 a gate control circuit 45 is employed. The gate control 45 is a flip-flop circuit basically similar to the well known Eccles-Jordan circuit. However, a pair of transistors 46 and 48 have been substituted for the triode tubes normally used. It will accordingly be understood that the circuit 45 possesses the ability to remain in either of two stable states and is therefore "bistable" as conventionally termed. These transistors 46, 48 have their emitters connected to the positive side of the previously mentioned battery 38 by way of a common resistor 50 and have their bases similarly connected, but through resistors 52 and 54 instead. The collectors, on the other hand, are connected to the negative side of battery 38 through resistors 56 and 58, respectively. Feedback is provided from the collector of transistor 46 to the base of transistor 48 via a resistor 60 shunted by a capacitor 62 and feedback is similarly provided from the collector of transistor 48 to the base of transistor 46 through the medium of a resistor 64 shunted by a capacitor 66. Also included in the gate control circuit is a diode 68 and capacitor 70 connected in series with each other and associated with the transistor 46. Likewise in diode 72 and capacitor 74 are associated with the transistor 48. The diodes 68 and 72 are connected so as to pass a positive going pulse to the collectors and bases of the transistors 46 and 48. It will be observed that the base of the transistor 44 belonging to the gate 22 is connected to the collector of the transistor 48 so as to effect a biasing change of said transistor 44 when the transistor is rendered highly conductive.

Attention is now directed to a combination reset and operate switch 76 of the double pole, single throw variety comprising a handle 78 having attached thereto a pair of spring leaf contacts 80, 82 which are normally spring urged into engagement with a pair of operate contacts 84 and 86, respectively, and which are engageable with a pair of reset contacts 88 and 90, respectively, when the handle is moved to the left.

The contact 86 of the switch 76 is connected to one terminal 92 of a jack member 94. The other terminal 96 of the jack member is connected to the positive side of a battery, as is the switch contact 90. The terminals 92, 96 are cooperable with terminals 98, 100 of a plug element 102. The terminals 98, 100 are attached to a pair of relatively long flexible conductors 104, 106 leading to a remote hammer switch 108 composed of a pair of normally open contacts 110, 112. All that need be said at this time about the switch 108 is that its contacts 110, 112 are closed, together with the normally closed contacts 82, 86, a circuit is completed to the negative side of the battery 98 through a resistor 114 having one end thereof connected to the capacitor 74. As will hereinafter be made manifest, closure of the switch 108 will be instrumental in triggering the gate control 46 to its "On" position if it happens to be "Off." By reason of the normally open contacts 82, 90 it will be noted that momentary closure of these contacts by moving the handle 78 in a "Reset" direction will accomplish the same result. More will be said later concerning the switch 78 and the role it plays in the overall functioning of my apparatus.

For the moment, it will be sufficient to understand that closure of the switch 108 will trigger the gate control 45 so that the transistor 48 will be made conducting. This in turn will trigger the gate 22 to its open or on state to provide a square wave output signal from the transistor 26 having the selected frequency of 4,000 c.p.s.

The gate 22 is coupled to an electronic binary counter 118 comprising a string of binary circuits 120. Inasmuch as these cascaded binaries 120 are circuit images of each other, only the first and tenth binaries are pictured in the drawing. Actually, the binaries 120 are individually similar in their operation to the gate control circuit 45, since they are both flip-flops.

Accordingly, it will be discerned that the various binaries 120 comprise a pair of transistors 122 and 124 having their bases connected to the positive side of battery 38 through base resistors 126 and 128, respectively. Load resistors 130 and 132 connect the collectors of these resistors to the other or negative side of said battery 38. Through the agency of a common resistor 134 the respective emitters of the transistors are also connected to the positive side of said battery 38. Like the flip-flop circuit utilized in the gate control circuit 45, feedback is provided from the collector of transistor 122 to the base of transistor 124 by way of a parallel connected resistor 136 and capacitor 138. By the same token a feedback avenue exists from the collector of transistor 124 to the base of transistor 122 via a shunted resistor 140 and capacitor 142.

Coupling of the gate 22 to the first binary circuit 120 is through a differentiating circuit including a capacitor 144 and a resistor 146. In serial relation with said differentiating circuit and the collector of the transistor 122 is a diode 148, and in similar relation with the collector of the transistor 124 is a second diode 150. It will be understood that the differentiating circuit composed of the capacitor 144 and resistor 146 is responsible for differentiating the abruptly changing wave fronts of the square wave signal from the gate 22. Owing to the substantially rectangular configuration of the signal, it follows that the differentiated signal is composed of alternating positive and negative going spikes with quiescent intervals therebetween. The 4,000 cycle frequency value is of course precisely retained.

Associated with each binary 120 is an auxiliary transistor 152 having its base joined to the diode 150 through a resistor 154. The collector and base of each transistor 152 has in circuit therewith a neon indicator light 156, resistors 158, 160 and a battery 162 for supplying a positive potential to the emitter and a negative potential to the collector of said transistor 152. The various transistors 152, there being one for each binary circuit 120, are maintained at a potential more negative than the transistors connected across the battery 38 by means of an intermediate battery 164. A differentiating circuit similar to that provided by the capacitor 144 and resistor 146 serves to couple the lowest order binary circuit 120 to its next higher order and so on through the entire string of successive binaries.

Attention is now directed to the presence of a transducer in the form of a moving coil geophone 166 having its coil connected to the remote ends of a pair of shielded conductors 168, 170. The length of these conductors 168, 170 is not of great importance, but should permit some spacing between the geophone 166 and the aforementioned circuitry so that the geophone will not be inadvertently influenced by any movement of the operator of the apparatus. The opposite ends of the conductors 168, 170 are connected to a plug element 172 having terminals 174 and 176. The plug element 172 in turn is matable with a jack member 178 equipped with terminals 180 and 182. The terminal 182 is connected directly to the positive side of a battery 184, whereas the other terminal 180 is connected to an impedance matching circuit including a resistor 186 and a capacitor 188.

The geophone signal which is picked up at a distance from where the seismic vibrations are produced is transmitted via the conductors 168, 170 to the impedance matching circuit 186, 188 and thence to a six stage amplifier indicated generally by the numeral 190. The amplifier comprises transistors 192, 194, 196, 198, 200 and 202, each included in a stage of the amplifier. The first stage transistor 192 has its base connected directly to the capacitor 188 in order to receive the geophone signal for amplification purposes. It will be observed that a capacitor 204 couples the various collectors to the base of the next succeeding transistor. It will also be discerned that the various collectors are connected to the negative side of the battery 184 through resistance-capacitance combinations that need not be described in detail. Further, it can readily be seen that the emitters of the transistors are connected to the positive side of this same battery through additional resistance-capacitance arrangements. With regard to the last-mentioned connections, though, specific comment will be made concerning the employment of a "Gain" control which consists of a plurality of rheostats 206, 208, 210 and 212 in the emitter circuits of the second, third, fourth and fifth amplifier stages, respectively. The ganging of said rheostats is by means of a single actuating member 216 shown only in phantom outline. Stages 1, 2 and 5 of the amplifier include a high frequency cut-off filter 215 for reducing certain types of noise signal. Cut-off starts at about 100 c.p.s. Low frequency response extends to 5 c.p.s.

Reference will now be made to a conductor 218 leading directly from the collector of the transistor 124 belonging to the last binary 120 to the contact 88 of the switch 76. Similarly, a conductor 220 extends from the transistor 202 in the last stage of the amplifier 190 to contact 84 of this switch. The conductor 218 carries an output signal from the last binary 120 and will trigger the gate control 45 to turn off or close the gate 22. This action can only occur, however, when the switch handle is moved to the "Reset" position, i.e. to the left. But on the other hand the conductor 220 will channel any output signal from the amplifier 190 to the gate control 45 to similarly trigger the gate 22 to its closed or off position through the normally engaged contacts 80 and 84. More will be said concerning the reason for the above triggering action during the ensuing operational sequence.

It is to be noted that there is employed a double throw-multiple pole switch designated generally by the numeral 222, the function of which is to permit either battery operation or operation from an external supply through a jack 224 connectable with a plug 226.

Having in mind the principal elements and their general organization with respect to each other in the system, it is believed that a complete understanding of the seismic apparatus exemplifying my invention may now be had from a description of the operation. For the sake of discussion we will assume that the switch 108 is closed by a hammer blow, although as hereinbefore indicated it may be part of a fire switch associated with a blasting detonator. Up to the moment the switch 108 closed the output from the oscillator 10 is prevented by the closed gate 22 from reaching the binary counter 118. Further, it will be assumed that all of the binaries 120 have been "Reset" so that the indicator lights 156 are all off.

The hammer blow through the agency of the switch 108 triggers the gate control 45 from one of its stable states to the other. For instance, if the transistor 46 has been highly conductive under such circumstances the flow of collector current produces a voltage drop across the collector load resistor 56, thus reducing the potential available for furnishing base bias current to the transistor 48 by way of the voltage divider comprised of the resistors 54 and 60. Also there is a voltage developed across the resistor 50 acting in opposition to the normal base bias current flow in the transistor 48. With the flow of collector current severely limited in the transistor 48 owing to the inadequate base bias, there will be for all intents and purposes no voltage drop across resistor 58. Consequently, practically the entire voltage of battery 38 is available for driving bias current through the voltage divider comprised of resistors 52, 64 to the base of the transistor 46. Because of the continued flow of bias current, the transistor 46 is maintained in a heavily conductive state.

Closure of the switch contacts 110 and 112 provides a positive trigger pulse that passes from the battery 98 through the capacitor 74, the diode 72 and the capacitor 66 to the base of the transistor. Such a positive-going pulse has the effect of reducing the collector current of transistor 46 with the consequence that the voltage drop across the resistor is substantially lessened. Because of this happening, there is developed a negative-going signal which acts through the capacitor 62 to affect the bias on the base of the transistor 48 in a direction to make the transistor 48 highly conductive. The gate control 45 remains in this stable state until another trigger pulse is applied which trigger pulse will be furnished in a manner later explained.

It will be noted that the same positive-going pulse from the switch 108 is also delivered to the base of the transistor 44 to drive this transistor into a high conducting state. This sequence of events results in there being produced a voltage drop across the emitter resistor 36 with a simultaneous making of the base of the transistor 24 more negative through the base resistor 32. Up to this time the oscillator signal was unable to drive the transistor into a highly conductive state, but with the assistance from the now conducting transistor 44 this is achieved.

The net result is that the gate 22 puts out a square wave signal having the adopted 4,000 c.p.s. frequency which signal is immediately passed to the first differentiating circuit 144, 146 so that a sharp triggering spike is applied to the first order binary 120, having been produced by the first positive going square wave. For purposes of discussion, we will say that up to the time that the first spike is supplied the transistor 122 has been highly conductive. Inasmuch as the binaries 120 function in the same manner as does the gate control 45, the manner in which the first binary 120 is flipped from its first stable state to its other stable state should be readily understood. It is when the first binary is in its stable state, i.e. with the transistor 124 conducting, that the series transistor 152 associated with said first binary is driven into a conductive state so that the first neon indicating light lights, signifying the passage of ¼ millisecond. With a free-running oscillator 10 a portion of one cycle may have elapsed after the switch 108 has performed its initiating function. Compared with the overall time count, any variance in the count of the first binary 120 is in reality insignificant. However, even the first registration can be made precise as to time by slightly revamping the gate control circuitry so that it initiates operation of the oscillator from a normally quiescent state. Of course, the higher the oscillator frequency the more accurate is the timing when a free running oscillator is utilized.

While the first binary 120 receives signals at the rate of 4,000 per second, it is obvious that only 2,000 per second are emitted. Of course, nothing happens to the remaining or higher order binaries during the triggering of the first binary. However, on the second cycle the first binary is flipped back to its original bistable state; i.e. transistor 122 conducts heavily. This action extinguishes the first light 156.

Also, at the same time the succeeding or second stage binary is triggered owing to the spike applied to the base of the next binary's transistor 124 and the second indicator light is lighted to indicate a lapse of ½ millisecond.

The third cycle of the 4,000 c.p.s. signal, corresponding to an elapsed time of ¾ millisecond, flips the first binary once again. Now both the first and second binaries are in their "On" state with the result that both "¼ ms." and "½ ms." are lighted. The sum of these denote an elapsed interval of ¾ ms.

The fourth cycle from the oscillator 10 triggers the first binary 120 off, thereby in turn triggering the second binary off but simultaneously triggering the third binary 120 on. The third binary light 156 indicates a period of 1 ms. The fifth input cycle turns on the ¼ ms. light again, but since the 1 ms. light is still on, a total time of 1¼ ms. is thereby indicated.

The whole sequence continues in this way for as long as signals reach the first binary. If the procedure should be stopped at any moment up to 255¾ ms. (that is 128—64—32 . . . —¼ ms.), the sum of those lights 156 that are "On" gives the total elapsed time, provided of course that all of the lights were off at the beginning. For intervals greater than 256 ms., the count starts all over. This stems from the fact that if the gate 22 remains open the first binary 120 and its light will again be triggered on just as it was originally by the first cycle of the oscillator signal.

Upon arrival of the first seismic wave at the geophone 166, which incidentally is oriented in such a way that the required output pulse therefrom will be obtained only for an upward ground motion, the electrical pulse produced by the geophone travels to the amplifier 190 via the resistor 186 and the capacitor 188 so as to render the transistor 192 momentarily conductive. The output pulse from the first stage transistor 192 is routed to the next stage transistor 194 and so on through the full six stages. The sixth stage, the last one, is purposely overdriven to yield square waves rather than sine waves. This insures that the very first portion of the ground motion at the geophone 166 will be amplified to the point where it will trigger the gate control 45. By suitably selecting the components of the amplifier 190 total maximum amplification of the first five stages is about 100,000 with another factor of 10 if the last stage is operated as a linear amplifier. The gain control comprising the rheostats 206, 208, 210 and 212 provides for reducing the amplification as needed. The optimum gain setting is dictated by two opposing considerations. On the one hand, the highest possible gain will improve the chances of detecting the first wave to arrive and of triggering the gate control 45 at the very beginning of this first wave. On the other hand, there are always small vibrations of the geophane 166 (due to wind, traffic, etc.) which will serve to trigger the gate control 45 if they are amplified sufficiently. Another possible source of noise is derived from power line pickup.

Although the "Gain" control is an important refinement, if not absolutely essential, it will now be explained that an output pulse from the transistor 202 of the amplifier 190 is routed over the conductor 220 to the contactor 84 and thence to the base of the transistor 48 of the gate control 45 via the diode 68 and the capacitor 62. As a result the gate control 45 switches back to its original stable state, i.e. the state in which it was found prior to receipt of a pulse produced by the closing of the switch 108. Such a happening of course closes the gate 22, since the effective biasing action of the transistor 44 is removed which during the counting operation had been holding said gate open for transmission of the 4,000 cycle frequency therethrough. In this way, the condition of the various lights 156 of the counter 118 presents an accurate measure of the time taken for the seismic wave to travel from its locus of origin, i.e. where the hammer blow was struck and where the switch 108 is situated, to the locus of detection, i.e. where the geophone 166 has been placed.

To "Reset" the counter 118, i.e. turn off all of its lights 156 in preparation for another counting operation, the handle 78 of the switch 76 is moved to its "Reset" position, i.e. to the left, thereby effecting engagement between the contacts 90 and 82. This forwards a pulse from the battery 98 through the diode 72 in the same manner as a pulse was supplied during a typical operational sequence described earlier herein. Thus the transistor 48 of the control circuit 45 is made highly conductive and the gate 22 is concurrently opened to inaugurate a "dry run" counting operation. When the transistor 124 of the highest order binary 120 registers a count its collector will supply a pulse that travels over the conductor 218 to the now engaged contacts 88 and 80 and thence to the base of the transistor 48 over the previously mentioned route. Therefore the counter 118 is inactivated by a path basically similar to that taken from the output side of the amplifier 190, only emanating from the tenth binary 120 instead.

Another use that can be made of the "Reset" equipment is that if the switch 76 is only momentarily moved to its reset position, then the counter 118 will not have a chance to turn itself off, but will cycle indefinitely unless the amplifier 190 actuates the gate control 45 to turn off the gate 22. This function is used for noise testing.

While the preceding description presents a fully operative embodiment of my invention, nonetheless the basic concepts permit one particular modification of the foregoing system that is worthy of especial comment. Thus, while the system that has been presented deals with the actuation of the switch 108, whether it be as a result of a hammer blow or in conjunction with a blasting detonator, it is within the purview of the invention to employ in lieu thereof another geophane 166a connected to an amplifier 190a through a pair of shielded conductors 168a, 170a. The output side of the amplifier is connected to terminals 98a, 100a of a plug element 102a, the plug element 102a being cooperable with the previously mentioned jack member 94. The geophone 166a may be identical with the geophone 166, whereas the amplifier 190a can be the same as the amplifier 190, the impedance matching circuitry having been omitted for purposes of simplification.

In using the modification described in the above paragraph, instead of engaging the plug element 102 with the jack member 94, the plug element 102a is mated therewith. When so connected, it will be appreciated that any seismic wave detected by the geophone 166a, after appropriate amplification by the amplifier 190a, will be delivered to the contacts 86, 90 of the switch 76. From then on the operation is exactly the same as if the plug element 102 had been connected with the circuit and the switch 108 closed. In other words, the geophone 166a initiates the triggering of the gate control 45 so as to open the gate 22 and thereby initiate a counting operation by the counter 118. Of course, stoppage of the counter 118 is accomplished by the geophone 166 as hitherto explained.

In this way, the two geophones 166 and 166a may be placed a predetermined distance apart, say ten feet or so, and the counter 118 will provide an accurate indication of the time interval that exists between the arrival of a seismic wave at one locus and the arrival at a second or spaced locus. In some situations the use of two geophones, in contradistinction to the use of a switch and one geophone, is the preferred arrangement. Not only can the geophone 166a be placed adjacent to where the hammer blow is struck (or where some other seismic wave production means is located), but it can be placed at a spaced location. In other words, the seismic waves need not originate at the point where the geophone 166a is situated. Consequently, the source of seismic vibrations need not be expressly intended for making the seismic survey. For instance, blasting operations might be in the process of being carried out in the general vicinity and reliance upon the vibrations thus set up could be utilized; also, pile driving operations in the neighborhood would provide a good source of vibrations.

Where the geophones 166, 166a are proximally located, it will be appreciated that lower signal levels can be used, because with relatively close geophone spacings there will not be the likelihood of extraneous noise entering into the operation and higher gains within the amplifier 190 can be employed. Consequently, it will be recognized that a fixed spacing of the geophones 166, 166a will provide a facile way of determining changes in subsurface slope conditions, for all that need be done is to keep moving the fixedly oriented geophones until a different tone interval is noted on the counter 118. Also, such an arrangement will find especial utility in the presence of underground objects, such as boulders and the like.

As many changes could be made in the above construction and many apparently widely different embodiments of the invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim:

1. Seismic apparatus comprising counting means, means for feeding a constant frequency signal to said counting means when seismic vibrations are present at one locus, and means for discontinuing the feeding of said constant frequency signal to said counting means upon the receipt of said seismic vibrations at a different locus, whereby said counting means will register a total count representative of the time taken by said seismic vibrations in travelling between said loci.

2. Seismic apparatus in accordance with claim 1 in which said counting means includes a series of electronic counting circuits and said constant frequency signal constitutes an A.-C. voltage signal.

3. Seismic apparatus comprising a series of binary counting circuits, oscillator means for generating a constant frequency signal, means for impressing said constant frequency signal on the first of said series of binary circuits dependent upon the existence of seismic vibrations at one locus, and means for removing said constant frequency signal from said first binary circuit upon the receipt of said seismic vibrations at a different locus, whereby said binary circuits will register a total count representative of the time taken by said seismic vibrations in travelling between said loci.

4. Seismic apparatus comprising means for generating a sequence of pulses at a constant rate, counting means capable of counting said pulses, means responsive to the existence of seismic vibrations at one locus for connecting said generating means to said counting means to inaugurate a counting operation, and means responsive to the receipt of said seismic vibrations of a different locus for disconnecting said generating means from said counting means to terminate said counting operation.

5. Seismic apparatus in accordance with claim 4 in which said means responsive to the production of seismic vibrations includes a normally open switch that is closed upon said production of seismic vibrations, and in which said means responsive to the receipt of said seismic vibrations includes a geophone.

6. Seismic apparatus in accordance with claim 5 in which said counting means includes a series of binary counting circuits.

7. Seismic apparatus comprising oscillator means for generating a constant frequency A.-C. voltage signal, a series of electronic counting circuits capable of counting the cycles of said A.-C. signal, gate means disposed intermediate said oscillator means and the first of said counters, gate control means connected to said gate means for opening and closing said gate means, first circuit means connected to said gate control means dependent upon the existence of seismic vibrations at one locus for triggering said gate control means in a direction to open said gate means and thereby allow said constant frequency signal to pass to the first of said counting circuits to inaugurate a counting operation, and second circuit means connected to said gate control means responsive to the receipt of said seismic vibrations at a different locus for triggering said gate control means in a direction to close said gate means and thereby prevent said constant frequency signal from passing to said first counting circuit to terminate said counting operation.

8. Seismic apparatus in accordance with claim 7 in which said first circuit includes a switch actuatable to closed position upon production of said seismic vibrations and said second circuit includes a geophone actuatable upon receipt of said seismic vibrations.

9. Seismic apparatus in accordance with claim 7 in which said first circuit includes a geophone actuable upon the receipt of seismic vibrations at said one locus and said second circuit includes a second geophone actuatable upon receipt of said seismic vibrations at said different locus.

10. Seismic apparatus in accordance with claim 7 in which said electronic counting circuits comprise a string of binaries, the apparatus including third circuit means connected between the last of the binary counters and said gate control means responsive to an output signal from said last binary counter for triggering said gate control means in a direction to open said gate means.

11. Seismic apparatus in accordance with claim 10 including a normally open switch in said third circuit means for resetting said binary counters only when said switch is closed.

12. Seismic apparatus comprising means for generating a series of pulses at a constant rate, gate means connected to said generating means for forwarding pulses arriving from said generating means, a bistable circuit connected to said gate means for opening said gate means when triggered into one stable state and for closing said gate means when triggered into its other stable state, a potential source, switch means including normally open contacts closable upon the establishment of a seismic wave to connect said potential source to said bistable circuit and thereby trigger said circuit into its said other stable state, means including a geophone responsive to the arrival of said seismic wave at a location spaced from said switch means for triggering said bistable circuit into its said one stable state, and electrical counting means for providing a count indicative of the number of pulses forwarded by said gate means during the interval said gate means is closed.

13. Seismic apparatus in accordance with claim 12 in which said switch means additionally includes manually actuatable normally closed contacts in series with said normally open contacts and manually actuatable normally open contacts for connecting said potential source directly to said bistable circuit to trigger said circuit into its said other stable state.

14. Seismic apparatus in accordance with claim 13 in which said switch means includes further normally open contacts connected between the output side of said counting means and said bistable circuit for triggering said bistable circuit into its said one state after a maximum count has been registered.

15. Seismic apparatus comprising means for generating a series of pulses at a constant rate, gate means connected to said generating means for forwarding pulses arriving from said generating means, a bistable circuit connected to said gate means for controlling the opening and closing of said gate means, said bistable circuit including a pair of transistors interconnected for flip-flop operation whereby conduction of one of said transistors opens the gate means and the conduction of the other closes said gate means, a potential source, a first switch unit including two sets of normally closed contacts, a second switch unit including a pair of normally open contacts in series with one of said sets of normally closed contacts and closable upon initiation of a seismic wave for connecting said bistable circuit to said potential source to cause conduction of said one transistor and thereby causing said gate means to open, electrical counting means connected to said gate means for receiving pulses transmitted by said gate means when open, a geophone responsive to the arrival of said seismic wave to produce an electrical signal signifying the arrival of said wave at said geophone, means for amplifying said electrical signal, the other set of said normally closed contacts being in circuit with the output of said amplifier and said bistable circuit for causing the output signal from said amplifying means to trigger the other of said transistors into a conductive state with a concomitant cutting off of said one transistor.

16. Seismic apparatus in accordance with claim 15 in which said first switch unit also includes two sets of normally open contacts, one set of said last-mentioned contacts being in circuit with said potential source and said bistable circuit for causing conduction of said one transistor when said one set of open contacts is closed, and the other set of said normally open contacts being in circuit with the output side of said counting means and said counting circuit for causing conduction of said other transistor when said counting means has reached a maximum registration, said first switch unit further including a handle for manually actuating said first switch unit, said handle when moved simultaneously opening said two sets of normally closed contacts and closing said two sets of normally open contacts.

References Cited in the file of this patent

UNITED STATES PATENTS

| | | |
|---|---|---|
| 2,575,759 | Higinbotham | Nov. 20, 1951 |
| 2,704,364 | Summers | Mar. 15, 1955 |
| 2,775,748 | Rod | Dec. 25, 1956 |
| 2,831,162 | Gross | Apr. 15, 1958 |
| 2,832,044 | Bliss | Apr. 22, 1958 |

OTHER REFERENCES

Gough: "Geophysics," April 1952, pp. 311–321, 330–333.

Notice of Adverse Decision in Interference

In Interference No. 92,837 involving Patent No. 2,980,884, R. A. Kaasa, Apparatus for measuring the time between seismic events with a counter, final judgment adverse to the patentee was rendered Apr. 2, 1964, as to claims 1, 4 and 5.

[*Official Gazette August 25, 1964.*]